(No Model.)  
2 Sheets—Sheet 1.
C. COLAHAN.
HARVESTER AND BINDER.
No. 358,922. Patented Mar. 8, 1887.
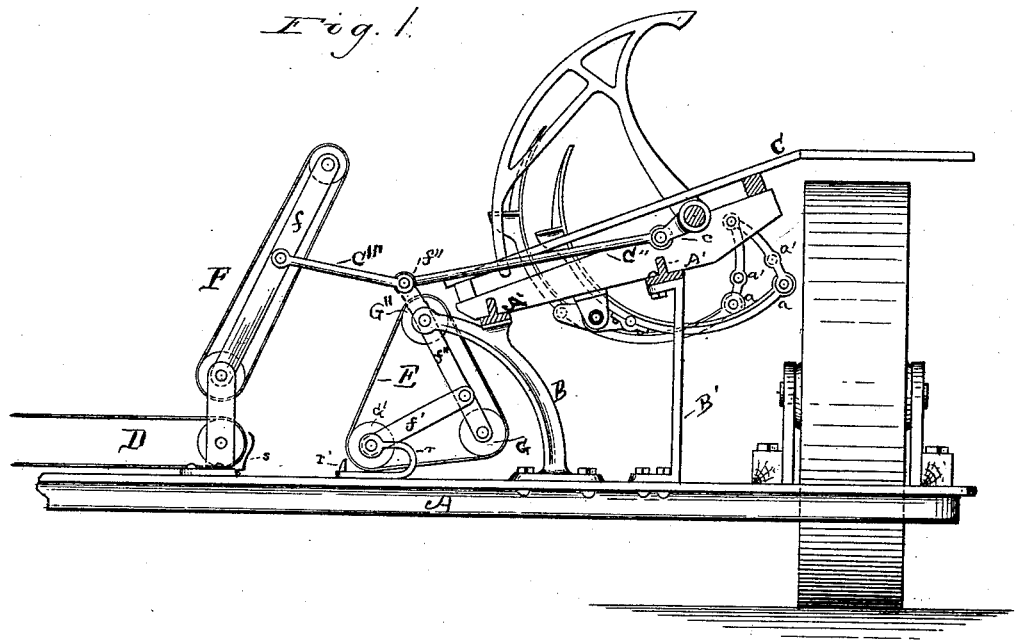
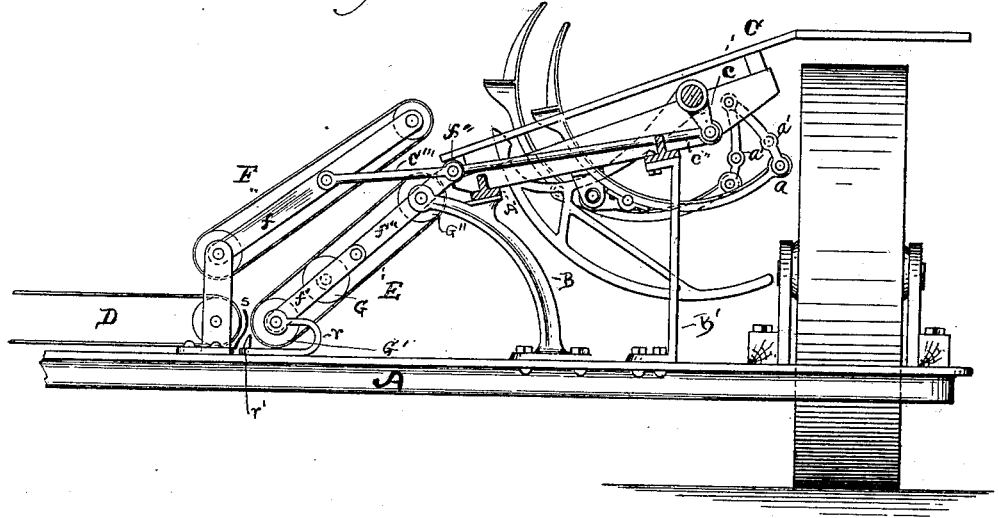
Witnesses.  
Henry Frankfurter  
M. H. Colahan
Inventor.  
Chas Colahan
N. PETERS, Photo-Lithographer, Washington, D. C.

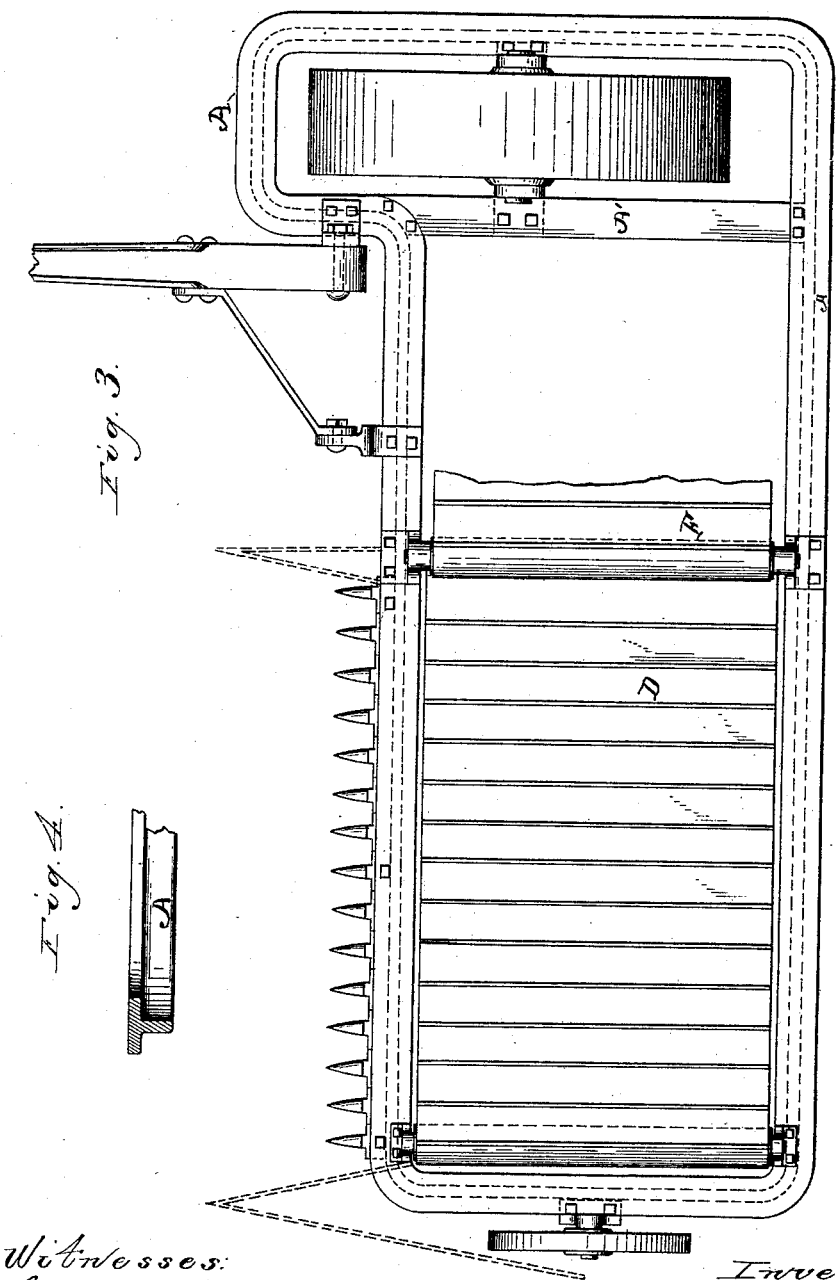

UNITED STATES PATENT OFFICE.

CHARLES COLAHAN, OF CLEVELAND, OHIO.

HARVESTER AND BINDER.

SPECIFICATION forming part of Letters Patent No. 358,922, dated March 8, 1887.

Application filed April 7, 1886. Serial No. 198,050. (No model.)

*To all whom it may concern:*

Be it known that I, CHARLES COLAHAN, of Cleveland, Ohio, have invented certain new useful Improvements in Harvesters and Binders, of which the following is a specification.

My invention relates to that class of grain-binding harvesters in which the grain is bound upon an inclined elevated binder-table located between the platform-carrier and the drive-wheel; and it consists in an improved organization of short elevator-aprons located between the binder-table and the platform-carrier.

The elevator-aprons are so operated as to alternately elevate the grain to the binder-table during the formation of the bundle, and as the binder-arm advances in forming the bundle said aprons will recede and permit the grain that is not gathered forward by the binding-arm to fall back free from contact with the apron into the receiver, and thus effectually aid in the separation of a bundle from the loose inflowing grain, and when said bundle is discharged and the binder-arm assumes its normal position beneath the binder-table the elevator-aprons will advance and close upon the loose grain in the receiver and compress and elevate the same to the binder-table, and thus, alternately receding and advancing, cause the grain to be delivered to the binder and permit the loose grain to fall back and accumulate in the receiver, which is thus enlarged sufficiently to permit its accumulation without interfering with the continual delivery of the grain from the platform-carrier as the harvester advances in cutting the grain.

In the accompanying drawings, Figure 1 is an elevated view showing the position of the several parts of the harvester and binder when the binder-arm has advanced in gathering the bundle and the elevator-carriers have receded and enlarged the space in the receiver. Fig. 2 is a similar view showing the several parts of the same when the binder-arm has receded beneath the binder-table and the elevator-carriers have advanced and contracted the space in the receiver, thus forcing the grain within reach of the packer-arms on the binder-table. Fig. 3 is a plan view showing the carrier-apron and part of the compressor-elevator apron, also the main frame of the harvester. Fig. 4 is a sectional view of said frame.

A represents the main frame of the harvester, which is supported upon the main drive-wheel and the grain-wheel, and which may be raised and lowered upon the axles of its supporting-wheels in the usual well-known manner. Said main frame is constructed of a single piece of T-iron, which is bent in the form desired to secure the proper balancing of the machine and its binder and its tilting upon the main axle.

B is the main supporting-arm, to which the folding carrier is secured at the top. Said supporting-arm also supports the lower side of the binder-frame A', an auxiliary arm or brace, B', supporting the upper side of said binder frame and table. Said arms or braces are secured to the main frame of the harvester by bolts, as shown.

C represents the binder table, the binder being of the well-known form in its general construction and operation.

D represents the carrier-apron. E represents the elevator-carrier, and F represents the compressor-elevator. *f* represents the end frame, which serves as a bearing for the rollers of said apron.

The elevator-carrier E is mounted on a folding frame composed of two parts, *f' f''*. At the lower end of the part *f'* is mounted a roller, G', and on each end of the part *f''* is a roller, G and G''. The part *f'* is hinged to the part *f''* between the rollers G and G'', so that when the frame is folded to retract or withdraw the elevator-apron from the carrier-apron in the receiver during the formation of a bundle it will be held taut by the roller G, which swings out of the frame and forces back the rear side of the apron, as indicated, so as to permit the apron to be readily moved back by the arm C''' and C'' without moving the bearing of the upper part of the upper roller in its bearing in the bracket B, which also supports the binder-table. The lower part, *f'*, of the folding apron has its bearing in a bracket, *r*, which slides back and forth on the bottom of the receiver toward and from the carrier-apron D.

*c* is an arm secured to the binder-arm shaft, and operates simultaneously therewith. C'' is a rod secured to said arm *c* at one end, and the other end is secured to the frame-bar *f''*, or to an arm extending above the center of oscillation and support of said folding frame f''. C''' is a rod secured at one end to said frame f'', while the other end is attached to the compressing-elevator frame f.

In Figs. 1 and 2 the packer-arms may have either of two points of support at the heel end by means of the pivotal pins a and a', secured to the swinging links upholding the heel ends of the packer, the object of which is to adjust the packer by raising and lowering its heel end, which will cause the end at the other side of the crank, which serves as its fulcrum, to gather the grain at a point a little lower down on the binder-table, or pack it closer up against the tripping-arm, by means of which a greater or less quantity of grain may be gathered in the bundle. When the packer is secured at its heel end to the lower pivot, a, on the swinging link, its actuating-crank will force the packer to gather the grain and pack the same farther forward on the table, and when the packer is secured at its upper pivot, a', its point will not advance the grain so far upon the binder-table, while at the same time it will gather it from a point lower down. I find the adjustment desirable in different conditions of grain; but I do not claim this as my invention.

In operation the harvester advances and cuts the grain, which, as it falls on the platform-carrier, is continuously moved forward toward the binder. The compressing elevator F and its lower roller will force the grain forward to the binder-table and into the receiver while it is in the position shown in Fig. 2, and the grain will flow over the shield s and against the rake-tooth r', which is secured to the arm or bracket r, carrying the axle of the lower roller, G', of the elevator-carrier E, this arm r also serving as a bearing for said roller and its arm or frame f' as it is advanced and retracted in the receiver. In Fig. 1 the binder-arm is in position of compressing the bundle, and the aprons E and F are separated to permit the inflowing grain to accumulate in the receiver at the end of the carrier D, and it is not forced therefrom until the binder arm assumes its normal position below the binder-table as the binder-arm shaft rocks back, and the arm C, secured thereto, will force the rods C'' C''' forward, which will cause the elevator-aprons to close. The apron E, which is supported and actuated by its upper roller on the arm or standard B, is caused to retract by means of the roller G, which is secured in the vibrating arm f''', which is vibrated and supported on the journal of the upper roller. As said roller G is forced by means of its vibrating arm f''' against the apron F it will cause said apron to expand on the side near its supporting-standard B, and the arm f', which is pivoted to the arm f'' at a point above the roller G, will withdraw said lower roller, G', and permit the apron to retract, as clearly shown in Fig. 1. When said binder-arm is in its normal position, as shown in Fig. 2, the grain will be elevated to the binder-table within reach of the packer-arms, and the binder will be caused to operate and the bundle formed in the usual well-known manner.

Having thus described my invention, what I claim, and desire to secure by Letters Patent, is—

1. In a grain-binding harvester, the combination of the carrier-apron D, the elevator-apron F, hinged at its lower end, the apron E, hinged at its upper end, and means for rocking the aprons on their pivots, whereby they are made to separate throughout their entire length, substantially as set forth.

2. The combination of the platform A, the carrier-apron D, the elevator-apron E, mounted on the platform opposite the inner end of the carrier-apron, the sliding bracket in which the lower end of the apron is mounted, and means for sliding the apron in its bracket along the platform toward and from the carrier-apron.

3. In a grain-binding harvester, the combination of the continuously-running apron D, the compressor and elevating aprons, the rollers on which the aprons are carried, the stationary bearing for the upper roller of the elevating-apron, the movable bearing for the lower roller, and the swinging roller for holding the apron taut, substantially as set forth.

4. In a grain-binding-harvester, the combination of the apron F, hinged at its lower end, the apron E, hinged at its upper end, and means for swinging the aprons on their hinges, consisting of the rod C'', pivoted to the binder-shaft and to the upper end of the apron E, and the rod C''', hinged to the upper end of the apron E and to the apron F.

CHARLES COLAHAN.

Witnesses:
M. H. COLAHAN,
WALTER A. BIDDLE.